(12) United States Patent
Pfohl et al.

(10) Patent No.: US 7,204,329 B2
(45) Date of Patent: Apr. 17, 2007

(54) UNDER-HOOD ENGINE AIR INTAKE SYSTEM

(75) Inventors: Jesse Lee Pfohl, Peosta, IA (US); Christopher James Maifield, Dubuque, IA (US); Douglas Gerard Meyer, Dubuque, IA (US); Daniel Joseph Huegerich, Dubuque, IA (US); Gregory Keith Werner, Durango, IA (US)

(73) Assignee: Deere & Company, Moline, IL (US)

( * ) Notice: Subject to any disclaimer, the term of this patent is extended or adjusted under 35 U.S.C. 154(b) by 296 days.

(21) Appl. No.: 10/807,597

(22) Filed: Mar. 24, 2004

(65) Prior Publication Data

US 2005/0211483 A1    Sep. 29, 2005

(51) Int. Cl.
*B60K 13/02* (2006.01)

(52) U.S. Cl. .................. 180/68.3; 180/68.1; 180/68.2; 180/69.24

(58) Field of Classification Search ........... 180/68.1–3, 180/69.24; 123/198 E
See application file for complete search history.

(56) References Cited

U.S. PATENT DOCUMENTS

| | | | | |
|---|---|---|---|---|
| 2,218,265 A * | 10/1940 | Nathan | ....................... | 180/68.3 |
| 3,207,250 A * | 9/1965 | Bamford | ..................... | 180/68.4 |
| 4,080,184 A * | 3/1978 | Petersen | ....................... | 55/315 |
| 4,341,277 A * | 7/1982 | Adamson et al. | .......... | 180/68.1 |
| 4,342,289 A * | 8/1982 | Komp | ........................ | 123/41.7 |
| 4,454,926 A * | 6/1984 | Akins | ........................ | 180/68.1 |
| 4,689,060 A * | 8/1987 | Koske | ........................ | 55/385.3 |
| 4,932,490 A | 6/1990 | Dewey | | |
| 5,785,139 A | 7/1998 | Freedy et al. | ............... | 180/68.1 |
| 6,068,675 A * | 5/2000 | Tsuda et al. | ................ | 55/385.3 |
| 6,263,850 B1 | 7/2001 | Winmill et al. | | |
| 6,435,264 B1 * | 8/2002 | Konno et al. | .................. | 165/41 |
| 6,510,832 B2 * | 1/2003 | Maurer et al. | .......... | 123/198 E |
| 6,655,486 B2 * | 12/2003 | Oshikawa et al. | ......... | 180/68.1 |
| 2004/0216934 A1 * | 11/2004 | Tomiyama et al. | ........ | 180/68.1 |

* cited by examiner

*Primary Examiner*—Christopher P. Ellis
*Assistant Examiner*—Vaughn Coolman

(57) ABSTRACT

An engine air intake system includes an engine air intake device and a plenum cooling compartment that is separate from the engine compartment by a baffle. A fan draws outside ambient air into the plenum cooling compartment and out of the plenum cooling area via a heat exchanger. The cooling compartment is designed such that a distance between the heat exchanger and the baffle provides a gap from which the engine air intake device removes ambient air as a source for engine air. An option is provide for the system to withdraw outside ambient air from an area external to the plenum cooling compartment in high debris environments.

43 Claims, 5 Drawing Sheets

UNDER-HOOD ENGINE AIR INTAKE SYSTEM

FIELD OF THE INVENTION

The invention relates to the structure and operation of air intake systems and to methods of supplying intake air to internal combustion engines. More specifically, it relates to a method, system and apparatus for supplying ambient or non-preheated air to an internal combustion engine for a work vehicle such as, for example, a mobile construction machine.

BACKGROUND OF THE INVENTION

Most mobile construction machines have an above-hood air intake. The above-hood air intake is usually covered by a shield to prevent the entrance of rain and other precipitation. Above-hood air intakes are typically designed to be low profile, i.e., evince a small signature. However, these intakes are required to be high enough to minimize the entry of dust and other debris settling near the hood and far enough from the exhaust stack associated with these machines to minimize the intake of preheated air. Pre-cleaners are typically available for above-hood air intake designs and are used to remove some of the debris from the intake air and, thusly, extend engine air filter life.

Some mobile construction machines are provided with conventional under-hood air intake systems having air intake tubes with inlet openings located in the engine compartment. When these systems have perforations in the hood of the engine compartment, the inlet opening is arranged to prevent the intake of rain and other precipitation. Thus, the inlet opening of the air intake tube is angled such that intake air enters in a direction that is horizontal to or at least partially opposite to the direction of the precipitation as it enters the engine compartment. Other under-hood air intake designs include air intake tubes that are routed to compact cooling package areas where the air inlets are located in areas separate from the engine compartment.

SUMMARY OF THE INVENTION

Conventional above-hood air intake systems for work vehicles obstruct visibility for the work vehicle operator. This is a consequence of attempting to meet the noted demands of locating the air intake (1) high enough to eliminate the entry of dust and debris over the hood and (2) far enough from the exhaust stack to eliminate or minimize the intake of preheated air. These disadvantages are only intensified by the pre-cleaners that are often attached to these systems in high debris environments.

A major disadvantage of conventional under-hood air intake systems where the intake port is located in the engine compartment is that they tend to intake preheated air via convection and radiation with respect to the engine. This is accentuated when these systems have perforations in the hood as the intake port must be angled away from the perforations and more toward the engine which preheats the air. In conventional systems where the intake port is located in a compact cooling package area, the intake is restricted and preheated by heat exchangers. Finally, it is not possible to adapt conventional above-hood pre-cleaners to under-hood air intake designs without extensive modifications to such machines.

The invention overcomes each of the above disadvantages by providing an under hood air intake system having an air intake tube routed to an area of a plenum cooling compartment through which ambient air flows. The plenum cooling compartment is formed by a baffle, a floor, a top door, a front door and at least one side door. The baffle separates the plenum cooling compartment from an engine compartment that is separately accessible. The air intake tube is routed to the plenum cooling compartment via the baffle such that the air inlet is located near the baffle in the plenum cooling compartment. Perforations are provided in the at least one side door of the plenum cooling compartment to allow an influx of ambient air and to allow accumulated debris removed from the ambient air, via the perforations, to be removed by gravity. Similar perforations are also provided in the top door. In one exemplary embodiment, a fan draws ambient air into the plenum cooling compartment via the perforations and out of the cooling compartment via at least one heat exchanger. The at least one heat exchanger is located a minimum distance from the inlet opening at the baffle in order to reduce or minimize flow restrictions and the intake of preheated air. The at least one heat exchanger may include multiple heat exchangers forming a fully or partially enclosed heat exchanger package within the plenum cooling compartment.

BRIEF DESCRIPTION OF THE DRAWINGS

Embodiments of the invention will be described in detail, with references to the following figures, wherein.

DETAILED DESCRIPTION OF THE ILLUSTRATED EMBODIMENT

Figure 1:
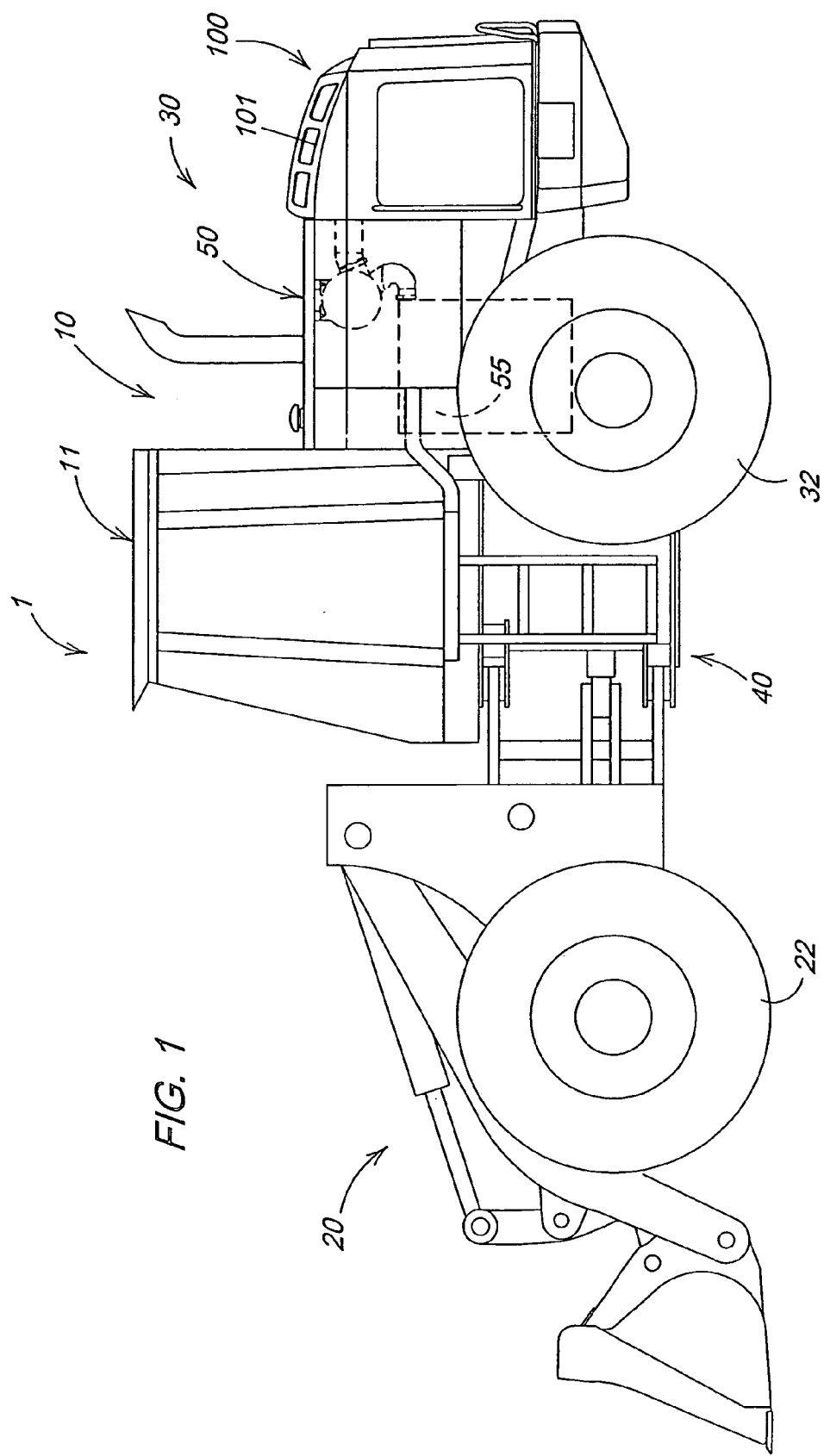
FIG. 1 is a view of a work vehicle in which the invention may be used.
Figure 2:
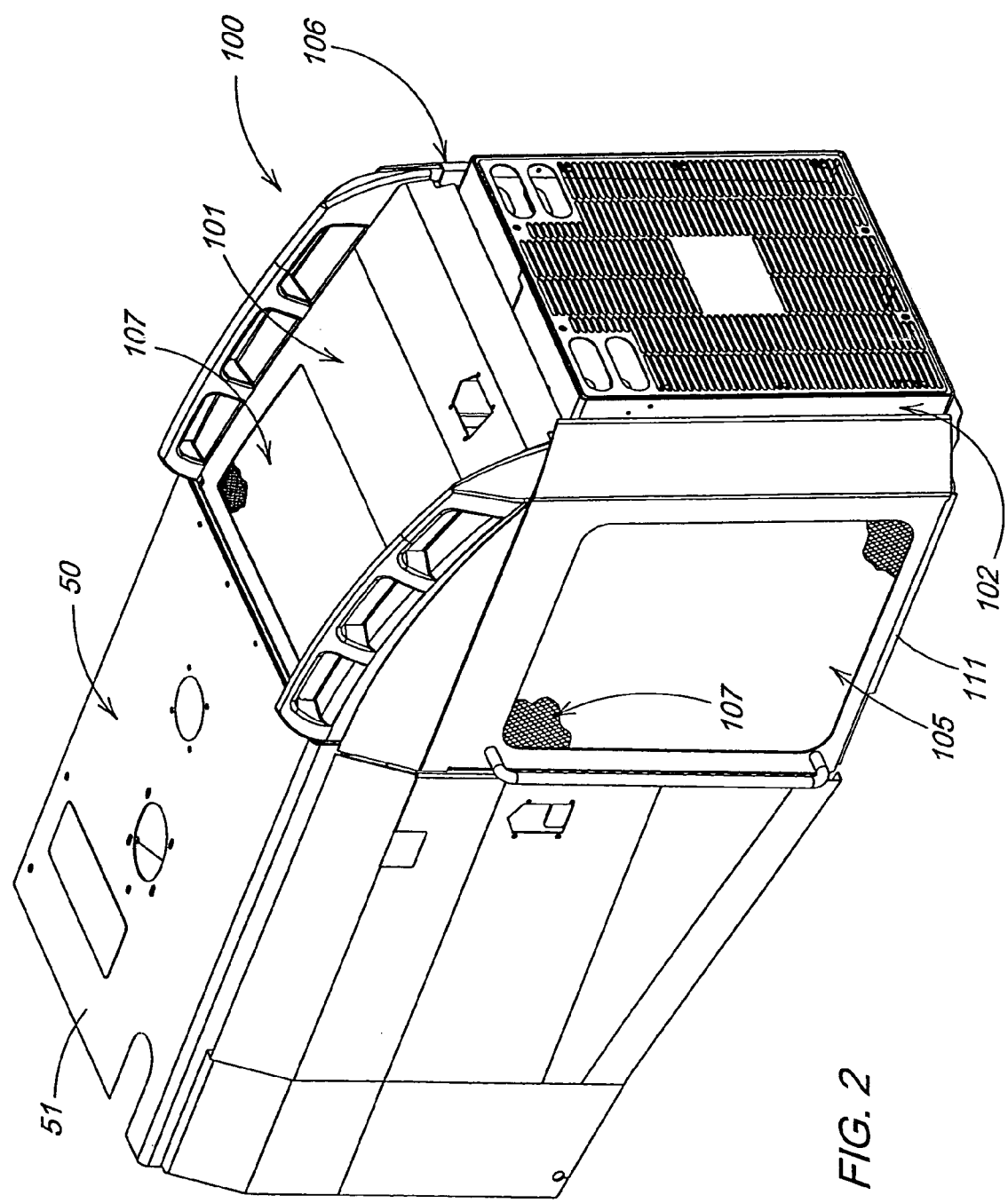
FIG. 2 is an oblique view of a rear portion of the vehicle illustrated in FIG. 1.

FIG. 1 illustrates a work vehicle in which the invention may be used. The particular work vehicle illustrated in FIG. 1 is an articulated four wheel drive loader 1 having a body 10 that includes a front body portion 20 pivotally connected to a rear body portion 30 by vertical pivots 40, the loader being steered by pivoting of the front body portion 20 relative to the rear body portion 30 in a manner well known in the art. The rear body portion 30 includes an engine compartment 50 and a separately accessible plenum cooling compartment 100. The front and rear body portions 20 and 30 are respectively supported on front drive wheels 22 and rear drive wheels 32. An operator's station 11 is provided on the rear body portion 30 and is generally located above the vertical pivots 40. The front and rear drive wheels 22 and 32 propel the vehicle along the ground and are powered in a manner well known in the art. FIG. 2 shows a detailed oblique view of the rear body portion 20 illustrated in FIG. 1.

Figure 3:
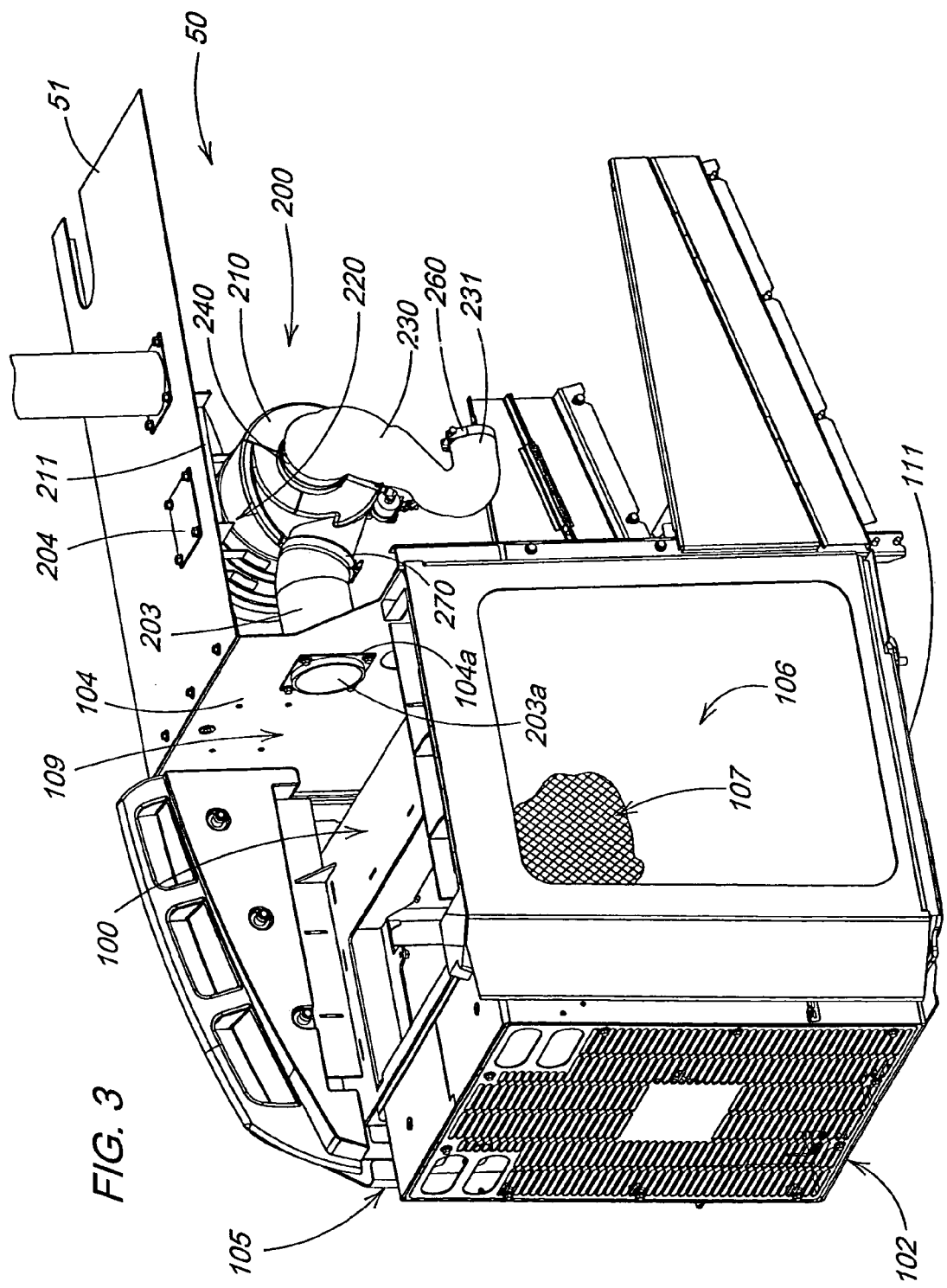
FIG. 3 is an oblique view of the cooling and engine compartments showing a body of an exemplary air cleaner rotated such that the intake tube is horizontally oriented and routed through the baffle wall.
Figure 4:
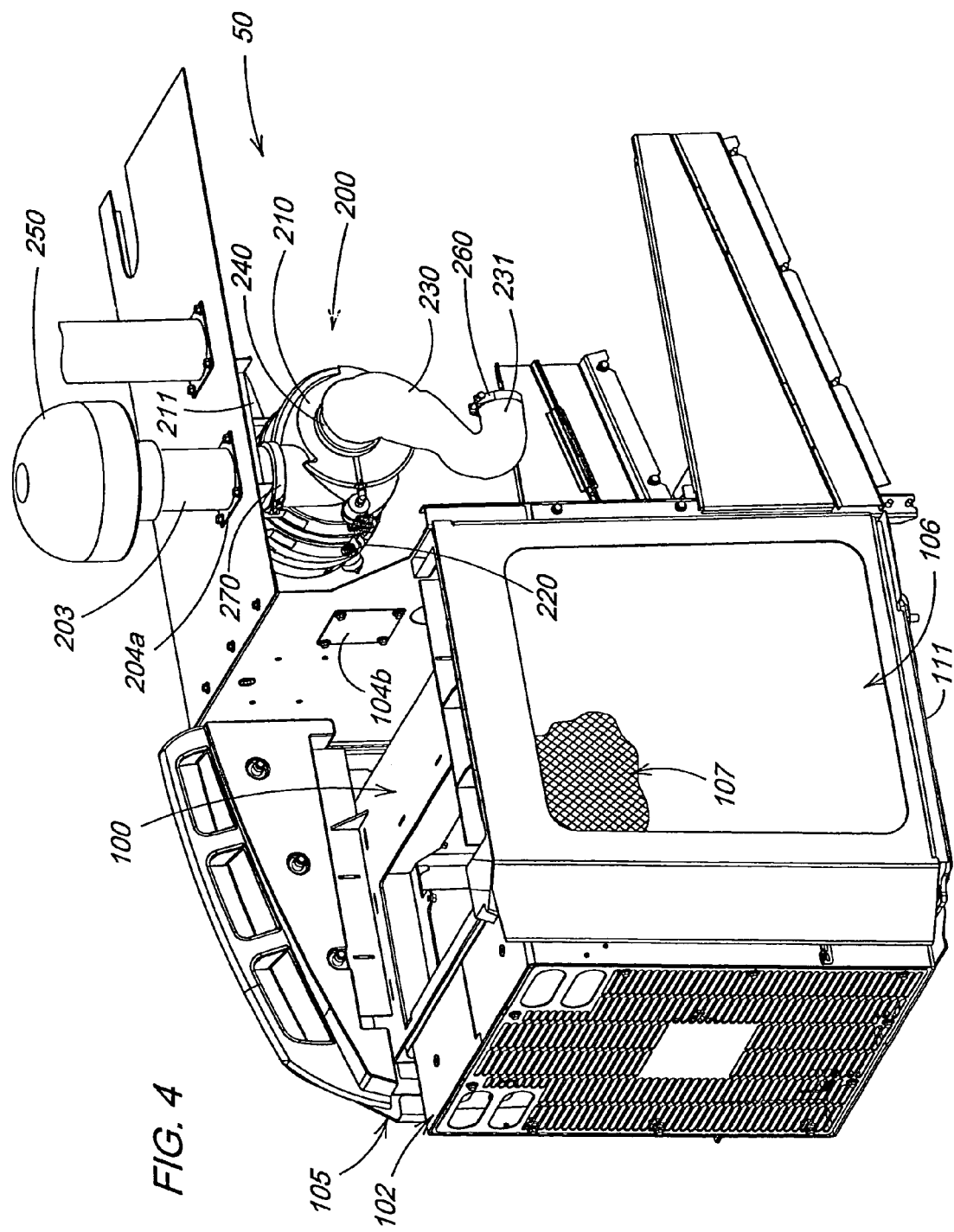
FIG. 4 is an oblique view of the cooling and engine compartments showing a portion of the body of the air cleaner rotated such that the intake tube is vertically oriented and connected to an above-hood pre-cleaner.

FIGS. 2, 3 and 4 are views of the plenum cooling compartment 100 and the separately accessible engine compartment 50 with the top door 101, two side doors 105, 106 and a fan door 102 of the plenum cooling compartment 100 illustrating an air intake system 200 including, a filter body 210, a filter body clamp 220, an air output tube 230, a first output tube clamp 240 connecting the air output tube 230 to the filter body 210, a second output tube clamp 260 connecting an outlet side 231 of the air output tube 230 to an engine 55, and an air intake tube 203 routed through a wall or baffle 104 separating the plenum cooling compartment 100 from the engine compartment 50. As illustrated in FIGS. 2, 3 and 4, the top door 101, the fan door 102, two side doors 105 and 106, the floor 111 and the baffle 104 form the plenum cooling compartment 100. The two side doors 105 and 106 and the top door 101 contain perforations 107 for removing large debris from ambient air flowing into the plenum cooling compartment. The filter body clamp 220 is fixedly attached to the frame via the brace 211 and supports the filter body 210.

Figure 5:
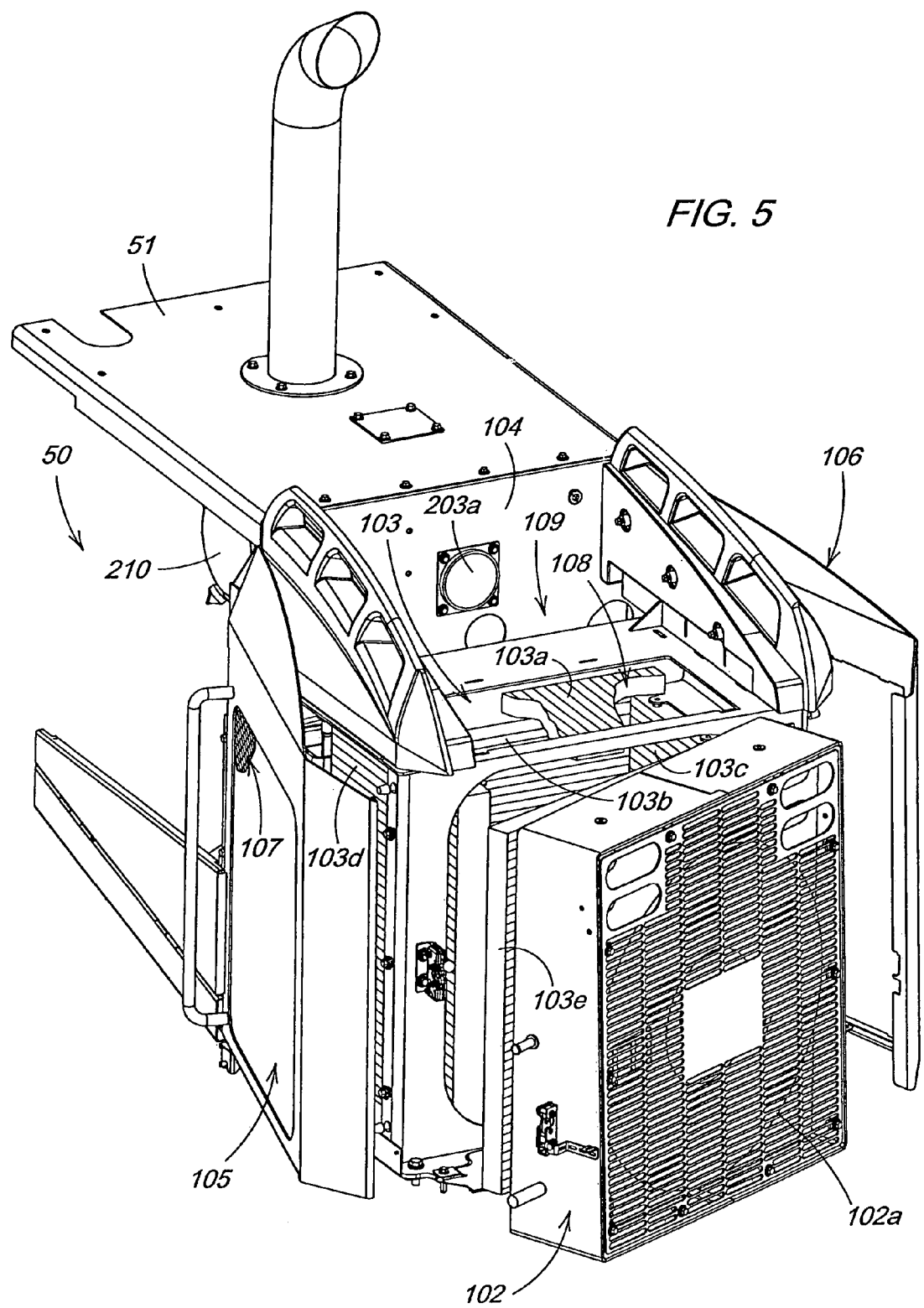
FIG. 5 is an oblique view of the cooling compartment with the hood removed and the fan doors open.

As illustrated in FIG. 5, in this embodiment the at least one heat exchanger 103 includes five heat exchangers 103a, 103b, 103c, 103d and 103e forming a heat exchanger package 108 located at a rear end of the vehicle and filling only a portion of the cooling compartment 100. This arrangement creates a gap 109 between the baffle 104, near which the air inlet 203a is located, and the heat exchanger package 108. A fan 102a forms a part of the fan door 102 and serves to draw ambient air, via the perforations 107 in the hood 101 and the two side doors 105, 106 into the plenum cooling compartment 100, via the heat exchangers package 108, and out of the plenum cooling compartment 100, via the fan door 102. As a result of this arrangement, non-preheated air flows in the gap 109. Thus, the air intake system 200 supplies the ambient air flowing in the gap 109 to the engine 55.

The plenum cooling compartment is designed such that the gap 109 between the heat exchanger package 108 and the baffle 104 is sufficiently large to reduce or minimize any air flow restrictions and the intake of preheated air. The size of the gap 109 varies with the size and design of the work vehicle.

The perforations 107 are sized to: (1) to block the entrance of airborne debris to the cooling compartment; and (2) to avoid frequent plugging of screens or perforations 107. Perforation sizes for these two somewhat conflicting objectives may be based on many factors, including: the nature and size of the debris, the convenience of the operator, the relative costs of operation, etc. A standard perforation size such as, for example, 3 mm, may be more suitable for work vehicles used in a variety of environments. Thus, a perforation size of about 3 mm is recommended for use in a variety of light debris environments, i.e., environments in which a significant portion of the debris has maximum dimensions greater than about 3 mm.

In environments of extremely heavy debris, i.e., environments in which a significant portion of the debris has maximum dimensions less than about 3 mm, the air intake system may be switched from an under-hood intake of air from the cooling compartment 100 to an above hood intake of air from an above-hood pre-cleaner 250 as shown in FIG. 4. This may be accomplished by: (1) removing the air intake tube 203 from the baffle 104 and covering the baffle inlet opening 104a with a baffle inlet door 104b; (2) loosening the filter body clamp 220 holding the filter body 210 in place; (3) loosening the air output tube clamp 240 fixedly holding the engine air output tube 230 to the filter body 210; (4) removing an above-hood inlet door 204 on the engine compartment hood 51; (5) rotating the filter body 210 to a position allowing the air inlet tube 203 to be routed through an opening 204a in the engine compartment hood 51 provided by the removal of the above-hood inlet door 204 while allowing the engine air output tube 230 to remain connected to the engine and to rotate with respect to the filter body 210; (6) connecting the air intake tube 203 to the above-hood pre-cleaner 250; (7) tightening the body clamp 220 to fixedly hold the filter body 210 in place; (8) tightening the output tube clamp 240 to fixedly hold the engine air output tube 230 in place. The outlet side 231 of air output tube 230 remains fixedly connected to the engine 55. Removal of the air intake tube 203 from the baffle 104 oh of the above hood inlet door 204 may be facilitated by loosening a tube clamp 270. The tube clamp 270 may be, subsequently tightened once the air intake tube 203 is properly positioned.

In environments of extremely heavy debris a pressurization option is provided wherein the fan reverses periodically to withdraw air from outside the cooling compartment 100 via the fan door 102 and to force it through the perforations 107 in the hood 101 and the side doors 105, 106 via the heat exchanger package 108. This allows the fan to forcefully remove debris accumulated on or in the perforations 107.

Having described the illustrated embodiment, it will become apparent that various modifications can be made without departing from the scope of the invention as defined in the accompanying claims.

The invention claimed is:

1. An air intake system for an engine of a work vehicle, comprising:
    a heat exchanger package, the heat exchanger package including at least one heat exchanger;
    a baffle;
    at least one side door;
    a top door;
    a fan door;
    a floor, the baffle, the at least one side door, the top door and the fan door forming a plenum cooling compartment, the baffle separating the plenum cooling compartment from the engine, the at least one heat exchanger being located at a rear end of the plenum cooling compartment, a distance between the heat exchanger package and the baffle forming a gap through which ambient air flows; and
    an engine air intake device, the engine air intake device removing a first portion of the ambient air flowing through the gap, removing debris from the first portion of the ambient air to produce clean air and supplying the clean air to the engine.

2. The air intake system of claim 1, wherein the engine air intake device comprises an air intake tube for removing the first portion of the ambient air from the gap.

3. The air intake system of claim 2, wherein the engine air intake device further comprises an air cleaner, the air intake tube supplying the first portion of the ambient air to the air cleaner, the air cleaner removing debris from the first portion of the ambient air to produce clean air and supplying the clean air to the engine.

4. The air intake system of claim 2, wherein the air intake tube is routed Through a hole in the baffle.

5. The air intake system of claim 3, wherein the air intake device further comprises an output tube, the output tube supplying clean air from the air cleaner to the engine.

6. The air intake system of claim 4, wherein the air intake tube is routed through the hole in the baffle to the gap.

7. The air intake system of claim 1, wherein the at least one side door has a first perforated screen for removing large debris from the ambient air before the ambient air enters the plenum cooling compartment.

8. The air intake system of claim 7, wherein the top door has a second perforated screen for removing large debris from the ambient air before the ambient air enters the plenum cooling compartment.

9. The air intake system of claim 8, wherein the fan door includes a fan for removing a second portion of the ambient air from the plenum cooling compartment via the at least one heat exchanger.

10. The air intake system of claim 1, further comprising a fan, the fan causing a second portion of the ambient air to move from an area inside the plenum cooling compartment to an area outside the plenum cooling compartment.

11. The air intake system of claim 10, wherein the fan causes the second portion of the ambient air to flow through the at least one heat exchanger.

12. The air intake system of claim 1, wherein the engine air intake device comprises an air inlet located at the gap.

13. The air intake system of claim 1, wherein the gap is located between the heat exchanger package and the engine.

14. A convertible engine air intake system for a work vehicle, comprising:
    a plenum cooling package, the plenum cooling package including:
        a fan;
        at least one heat exchanger;
        a top door;
        a floor;
        at least one side door, at least one of the top door and the at least one side door having perforations; and
        a baffle, the at least one heat exchanger, the top door, the floor, the at least one side door and the baffle forming a plenum cooling compartment, the baffle separating the plenum cooling compartment from the engine, the fan moving a first ambient air from a first area outside the plenum cooling compartment into the plenum cooling compartment via the perforations to form ambient plenum air, the fan moving a first portion of the ambient plenum air through the at least one heat exchanger to an area outside the plenum cooling compartment, and
    an engine air intake device removing a second portion of the ambient plenum air and supplying it to the engine, the engine air intake device capable of removing a second ambient air from a second area outside the plenum cooling compartment and supplying it to the engine.

15. The convertible engine air intake system of claim 14, further comprising an air pre-cleaner located outside the plenum cooling compartment, wherein the engine air intake device removes the second ambient air from the second area via the pre-cleaner.

16. The convertible engine air intake system of claim 15, wherein the engine air intake device comprises an air intake tube and an air cleaner.

17. The convertible engine air intake system of claim 16, wherein the baffle includes a baffle inlet area capable of being opened to form a baffle inlet hole through which the air intake tube may be routed the baffle inlet area capable of being closed.

18. The convertible engine air intake system of claim 17, further comprising an engine compartment having a hood, wherein the hood includes a hood inlet area capable of being opened to form a hood inlet hole through which the air intake tube may be routed, the hood inlet area capable of being closed.

19. The convertible engine air intake system of claim 18, wherein the hood inlet area is closed when the air intake tube is routed through the baffle.

20. The convertible engine air intake system of claim 19, wherein the baffle inlet area is closed when the air intake tube is routed through the hood.

21. The convertible engine air intake system of claim 20, wherein the air intake tube may be routed through either of the hood inlet area and the baffle inlet area.

22. The convertible engine air intake system of claim 21, wherein the air cleaner comprises a filter body, the air intake tube being positioned at one of the hood inlet area and the baffle inlet area by rotating the filter body.

23. The convertible engine air intake system of claim 21, further comprising an output tube for supplying the engine with clean ambient air from the air cleaner, wherein the air intake tube is positioned at one of the hood inlet area and the baffle inlet area by rotating the filter body relative to the output tube.

24. A work vehicle having an engine air intake system, the engine air intake system comprising:
    a plenum cooling package, the plenum cooling package including:
        a fan;
        at least one heat exchanger;
        a top door;
        a floor;
        at least one side door, at least one of the top door and the at least one side door having perforations; and
        a baffle, the at least one heat exchanger, the top door, the floor, the at least one side door and the baffle forming a plenum cooling compartment, the baffle wall separating the plenum cooling compartment from the engine, the fan moving a first ambient air from a first area outside the plenum cooling compartment into the cooling compartment via the perforations to form ambient plenum air, the fan moving a first portion of the ambient plenum air through the at least one heat exchanger to an area outside the plenum cooling compartment; and
    an engine air intake device removing a second portion of the ambient plenum air and supplying it to the engine, the engine air intake device capable of removing a second ambient air from a second area outside the plenum cooling compartment and supplying it to the engine.

25. The work vehicle of claim 24, wherein the at least one side door includes a first perforated screen that removes debris from the ambient air before the ambient air enters the plenum cooling compartment.

26. The work vehicle of claim 25, wherein the top door includes a second perforated screen that removes debris from the ambient air before the ambient air enters the plenum cooling compartment.

27. The work vehicle of claim 25, further comprising a fan door, the fan door including the fan.

28. The work vehicle of claim 24, further comprising a fan door, the fan door including the fan.

29. The work vehicle of claim 28, wherein the fan causes all of the ambient plenum air to flow through the at least one heat exchanger.

30. The work vehicle of claim 24, wherein the engine air intake device comprises an air intake tube for removing the second portion of the ambient plenum air.

31. The work vehicle of claim 30, wherein the engine air intake device further comprises an air cleaner, the air intake tube supplying the second portion of the ambient plenum air to the air cleaner, the air cleaner removing debris from the second portion of the ambient plenum air to produce clean air and supplying the clean air to the engine.

32. The work vehicle of claim 30, further comprising a gap formed by a distance between the baffle and the at least one heat exchanger, wherein the air intake tube is routed through a hole in the baffle to the gap.

33. The work vehicle of claim 31, wherein the air intake device further comprises an output tube, the output tube supplying clean air from the air cleaner to the engine.

34. A work vehicle having an engine and an engine air intake system, the engine air intake system comprising:
  a plenum cooling package, the plenum cooling package including:
    a fan;
    at feast one heat exchanger;
    a top door;
    at least one side door, at least One of the top door and the at least one side door having perforations; and
    a baffle, the at least one heat exchanger, the top door, the at least one side door and the baffle wall forming a plenum cooling compartment, the baffle separating the plenum cooling Compartment from the engine, the fan moving a first ambient air from a first area outside the plenum cooling compartment into the cooling compartment via the perforations to form ambient plenum air, the fan moving a first portion of the ambient plenum air through the at least one heat exchanger to an area outside the plenum cooling compartment, a distance between the heat exchanger and the baffle forming a gap through which ambient air flows; and
  an engine air intake device, the engine air intake device removing a second portion of the ambient plenum air from the gap and supplying it to the engine, the engine air intake device capable of removing a second ambient air from a second area outside the plenum cooling compartment and supplying it to the engine.

35. The work vehicle of claim 34 further comprising an air pre-cleaner located outside the plenum cooling compartment, wherein the engine air intake device removes the outside ambient air from the second area via the pre-cleaner.

36. The work vehicle of claim 35, wherein the engine air intake device comprises an air intake tube and an air cleaner.

37. The work vehicle of claim 36 wherein the baffle includes a baffle inlet area capable of being opened to form a baffle inlet hole through which the air intake tube may be routed.

38. The work vehicle of claim 37, further comprising a hood having a hood inlet area, the hood inlet area capable of being opened to form a hood inlet hole through which the air intake tube may be routed, the hood inlet area capable of being closed.

39. The work vehicle of claim 38, wherein the hood inlet area is closed when the air intake tube is routed through the baffle inlet hole.

40. The work vehicle of claim 39, wherein the baffle inlet area is closed when the air intake tube is routed through the hood inlet hole.

41. The work vehicle of claim 40, wherein the air intake tube may be routed through either of the hood inlet area and the baffle inlet area.

42. The work vehicle of claim 37, wherein the baffle inlet area comprises a first inlet door.

43. The work vehicle of claim 38, wherein the hood inlet area comprises a second inlet door.

* * * * *